2,782,133
PROCESS OF IMPREGNATING CELLULOSIC MATERIAL HALOGENO - NITRIDES OF PHOSPHORUS

Pierre Henri Paul Vallette, La Contamine, Lancey, France, assignor to Compagnie Française des Matieres Colorantes, Paris, France, a French company No Drawing. Application April 20, 1954, Serial No. 424,499

Claims priority, application France April 29, 1953

3 Claims. (Cl. 117—138)

The present invention concerns improvements in and relating to the treatment of fibrous materials.

The fireproofing of cellulosic materials by means of phosphorus derivatives has been known for a long time. Thus when ammonium phosphate for example, is applied in solution to textile fibres fabrics are obtained which are not easily combustible do not inflame, and show only some afterglow when set on fire, or under the action of a naked flame. However, the effect produced does not resist bad weather and it is for this reason that attempts have been made to use phosphorus derivatives which are insoluble in water and even to make complex esters of phosphoric acid with cellulose but the use of these methods is in general rather difficult. Finally it has been proposed to use as fireproofing agents the products obtained by the action of ammonia on phosphorus oxychloride, phosphorus thiochloride and phosphorus pentachloride. If one considers, for example, the action of ammonia on phosphorus pentachloride, there is formed besides the pentamide of phosphorus very considerable quantities of ammonium chloride:

(1)  $PCl_5 + 10NH_3 \rightarrow P(NH_2)_5 + 5NH_4Cl$

The technical products obtained according to this process are therefore always strongly charged with ammonium chloride, a salt which is often harmful to textile fibres.

It has now been found that in aqueous solution, the products resulting from the action of anhydrous ammonia on the halogeno-nitrides of phosphorus confer on materials to which they are applied, fireproof properties which are resistant to water, bad weather and washing.

The halogeno-nitrides of phosphorus such as $(PNCl_2)_n$ can be prepared, for example, by the action of ammonium halides on phosphorus pentahalides, if necessary in the presence of an inert solvent, at temperatures of about 140° C. This technique has been described by Schenck and Römer (Berichte 57, p. 1343) who operated in the presence of tetrachloroethane, but other solvents, such as ortho-dichlorobenzene, may be used. In the course of this reaction, different polymers can be obtained following, for example, the reaction:

(2)  $nPCl_5 + nNH_4Cl \rightarrow (PNCl_2)_n + 4nHCl$

The halogeno-nitrides of phosphorus themselves are very good fireproofing agents. However, being insoluble in water, it is necessary to apply them in solution in an organic solvent, such as benzene or alcohol, or in the form of an emulsion. The products resulting from the action of anhydrous ammonia on the halogeno-nitrides of phosphorus can however be completely dissolved in water, as a result of their hydrolysis with probable formation of polyphosphimates. The aqueous solutions are applicable in a very convenient manner to the most diverse materials. By means of a thermal treatment the water-soluble phosphorus derivatives, thus applied on fibres, can be converted into insoluble phosphorus derivatives, which property renders them particularly valuable since the fireproofing effects produced in this manner resist not merely bad weather and water but also washing.

The water-soluble products of this invention can be obtained, for example, by the action of dry ammonia on phosphorus halogeno-nitrides, which may if desired be in solution in an inert organic solvent such as carbon tetrachloride, tetrachloroethane, chlorobenzene or orthodichlorobenzene, in which the halogeno-nitrides of phosphorus are soluble. The reaction products with anhydrous ammonia are insoluble in these solvents and precipitate gradually on introduction of anhydrous ammonia, their isolation then being easily effected by filtration and the solvent can be recovered for a later operation.

Products of this type have already been prepared by Besson and Rossel (C. R., p. 1149) but they have not hitherto been used for fireproofing. There is obtained in the course of these processes halogen-amine compounds such as $(P_3N_3Cl_5NH_2)_n$ and $$(P_3N_3Cl_4(NH_2)_2)_n$$

or aminated compounds such as $(PN(NH_2)_2)_n$, for example, in accordance with the reaction:

(3)  $(PNCl_2)_n + 4nNH_3 \rightarrow (PN(NH_2)_2)_n + 2nNH_4Cl$

Moreover it is not necessary for the preparation of these derivatives to isolate the halogeno-nitrides of phosphorus. For example the same solvent may be used for the reaction of anhydrous ammonia on the chloro-nitrides of phosphorus as is used for preparing the chloro-nitrides of phosphorus starting from ammonium chloride and phosphorus pentachloride, and even for preparing phosphorus pentachloride starting from phosphorus trichloride and chlorine. The preparation of aminated derivatives starting from phosphorus trichloride or pentachloride in the same solvent in several phases, forms one of the particular objects of the present invention. The comparison of Reactions 1, 2, and 3 shows that the raw products obtained by the action of anhydrous ammonia on halogeno-nitrides of phosphorus have a higher content of phosphorus than those obtained by action of anhydrous ammonia on phosphorus pentachloride and that the manufacture of the former requires only half the ammonia required for the manufacture of the latter.

For fireproofing by means of the products obtained by the action of anhydrous ammonia on the halogeno-nitrides of phosphorus they are treated by water or by an aqueous solution, if desired while heating to 80–100° C.; there can be added to these solutions, before or after the addition of the products of reaction of anhydrous ammonia on the halogeno-nitrides of phosphorus, other fireproofing agents, softening agents, plasticizers, fungicides, waterproofing agents, buffer substances; the materials to be fireproofed are treated with these solutions, containing, if desired, in solution or in suspension the agents mentioned above by soaking, spraying or foularding. The fibrous materials are then subjected, in accordance with one of the preferred methods of carrying out the invention, to a thermal treatment, which can be done after drying in air. This thermal treatment is the shorter the higher the temperature and its duration is also reduced in the case where the materials have first of all been dried in air.

The following table gives indications of the duration of the thermal treatment, these durations should not however be considered as necessary in all cases, for they depend on the nature of the fibres, of the apparatus and of the result which it is desired to obtain.

THERMAL TREATMENT

| Temperature in ° C. | 130 | 140 | 150 | 160 | 170 |
|---|---|---|---|---|---|
| Duration of treatment for the fibres emerging from the fire-proofing bath minutes | 20 | 15 | 12 | 8 | 4 |

The materials thus treated can then be washed in warm water or in water containing a detergent and dried afresh. They are fireproof, that is to say, they do not inflame and do not show any ignition point under the action of naked flames. This effect persists even after several washings with a detergent. The fibres can, if desired, be waterproofed by then treating them, for example, with a solution of chromium chlorostearate.

The process is applicable to the most diverse fibrous materials, such as, for example, textile fibres (cellulosic, animal, synthetic), wood, paper, leather, films formed of regenerated cellulose. The impregnation bath being colourless, dyed, textile materials can be fireproofed without alteration, in general, of the shade of the dyeing, nor matting effect, nor alteration of the "handle" and of the mechanical resistance.

The present invention comprises likewise the treatment of fibrous materials by means of the aqueous solutions obtained from the products resulting from the action of anhydrous ammonia on the halogeno-nitrides of phosphorus, for any purpose other than fire-proofing.

The invention will be more clearly understood by reference to the following examples which are purely illustrative.

Example 1

There is refluxed for 20 hours a mixture of 225 parts by weight of phosphorus pentachloride, 74 parts by weight of finely pulverized ammonium chloride and 1200 parts of tetrachloroethane. Hydrochloric acid is liberated abundantly at the start of the reaction and this liberation takes place during about the first seven hours of reflux. The temperature of reflux which was 133° C. at the start, rises progressively to 146° C. The excess of ammonium chloride is separated from the tetrachloroethane by filtration, then the solvent is driven off under vacuum. 113 parts by weight of a pale brown product are obtained, which crystallises on cooling. It is the phosphorus chloronitride $(PNCl_2)_n$ (yield 90%). This product is insoluble in water, but most organic solvents such as benzene, ether, alcohol and the chlorinated solvents dissolve it easily.

100 parts of the thus prepared phosphorus chloronitride are dissolved in 750 parts of anhydrous carbon tetrachloride, and a current of dry ammonia gas is passed into this solution at a temperature not exceeding 10° C. A colourless product begins to precipitate. The saturation with ammonia requires about 1 hour. The non-appearance of a precipitate when ammonia gas is bubbled through a test sample of the solvent indicates that all the phosphorus chloronitride has reacted. Moreover the reaction ceases to be exothermic. The colourless product thus obtained is pressed out, whilst the carbon tetrachloride can serve for a second operation. 175 parts of raw product are thus obtained. 20 parts by weight of the product thus obtained are dissolved in 100 parts by weight of boiling water. A cotton fabric is introduced into the solution and is then wrung out and dried in air. After this preliminary treatment the fabric is heated for 4 minutes to 160° C. It is washed in warm water and dried. The appearance and feel of the fabric are the same as before. If it is exposed to the flame of a Bunsen burner, it does not catch fire but only partially carbonizes without appearance of flame. If the flame is withdrawn the fabric does not show any after-glow.

Example 2

A current of chlorine is passed into a solution of 150 parts by weight of phosphorus trichloride in 1200 parts of tetrachloroethane, in a quantity just sufficient to obtain phosphorus pentachloride. 75 parts by weight of $NH_4Cl$ are then added and the mixture is refluxed for 20 hours. The procedure of Example 1 is then followed and 110 parts by weight of phosphorus chloronitride are obtained.

100 parts of the thus obtained chloronitride are dissolved in 750 parts by weight of anhydrous carbon tetrachloride, and a current of dry ammonia is passed into this solution, at a temperature not exceeding +10° C. A colourless product is not long in precipitating. The further treatment of the product, and the application of the same to cotton fabric are effected as in Example 1.

Example 3

A mixture of 320 parts by weight of orthodichlorobenzene, 50 parts by weight of $PCl_5$, and 16 parts by weight of $NH_4Cl$ is refluxed for 10 hours. The reflux temperature passes progressively from 145° C. to 160° C. whilst the liberation of HCl takes place. After separation, by filtration of the ammonium chloride in excess, the orthodichlorobenzene is driven off in vacuo and 27 parts by weight of phosphorus chloronitride are obtained.

The thus obtained chloronitride is utilized as in Example 1.

Example 4

Phosphorus chloronitride is prepared by the method of Example 1, working with the same quantities of products. When the excess of ammonium chloride has been removed, the tetrachloroethane is not driven off but ammonia is passed directly into this up to saturation, at a temperature below +10° C. A colourless product precipitates which is pressed out. This product is practically identical with that obtained in Example 1 and confers on fibrous materials the same fireproofing properties. The tetrachloroethane can be recycled.

Example 5

Unsized paper is passed into an aqueous bath containing 20% of the product of Example 4 then pressed out and dried in 12 minutes at 150° C. It is then washed in water and dried. A paper is obtained which, put into a naked flame, is carbonized without flame; it is extinguished as soon as it is withdrawn from the flame.

Example 6

20 parts by weight of the product of Example 4 and 5 parts by weight of hexamethylenetetramine are dissolved in 100 parts of boiling water. A cotton fabric is introduced into the solution, it is wrung out and heated directly to 160° C. for 8 minutes. It is washed in warm water, dried and then impregnated with a 4% aqueous solution of chromium chlorostearate.

In this manner a fabric is obtained which is at once both fireproofed and waterproofed, and these two effects persist even after washing with water containing 5 gr./litre of Marseilles soap and 2 gr. per litre of sodium carbonate.

Example 7

A mixture of 225 parts by weight of $PCl_5$ and 74 parts by weight of finely pulverized $NH_4Cl$ is refluxed for 20 hours with 1200 parts by weight of tetrachloroethane. The method of operation as in Example 1 is followed. 113 parts by weight of $(PNCl_2)_n$ are obtained which are taken up by 250 parts by weight of petrol ether (density 0.650–0.660). The polymers of order greater than 4 being insoluble in this solvent $(PNCl_2)_3$ and $(PNCl_2)_4$ which are soluble in petrol ether are extracted. On driving off the solvent 70 parts by weight of the mixture of the trimer and the tetramer are obtained.

50 parts by weight of the phosphorus chloronitride thus obtained (mixture of trimer and tetramer) are dissolved in 400 parts of carbon tetrachloride. The solution is then saturated with NH₃. A colourless product is precipitated. It is pressed out and dried at 40–50° C. under vacuum. 87 parts by weight of a crude product are obtained which, applied to cotton fabric in the manner described in Example 3, gives an excellent fireproofing effect.

*Example 8*

An intimate mixture of 520 parts by weight of $PCl_5$ and 400 parts by weight of $NH_4Cl$ is heated to 150° C. for 6 hours. The reaction mass is taken up in 1000 parts by weight of $CCl_4$. It is filtered to separate the $NH_4Cl$ and $NH_3$ is bubbled into the solution of $(PNCl_2)_n$ in $CCl_4$ taking care that the temperature does not exceed 20° C. A colourless product is not long in precipitating. The saturation with $NH_3$ requires about 1 hour. The colourless product is pressed and dried and one obtains 420 parts by weight of crude product.

20 parts by weight of this crude product are dissolved in 100 parts by weight of boiling water and 8 parts by weight of urea and 5 parts by weight of sodium formate are added to the solution. A cotton fabric is introduced into the solution thus obtained. It is wrung out and dried for 10 minutes at 160° C. It is washed in water at 50° C. containing 5 gr. per liter of Marseilles soap and 2 gr. per litre of $Na_2CO_3$. The fabric is dried again. If it is exposed to the flame of a Bunsen burner it does not catch fire but carbonizes only partially without appearance of fire. As soon as the flame is withdrawn the fabric does not show any after-glow.

*Example 9*

An intimate mixture of 52 parts by weight of $PCl_5$ and 50 parts by weight of $NH_4Cl$ is heated to 150° C. for 5 hours. 65 parts by weight of a raw product containing approximately 45% of $(PNCl_2)_n$ are obtained. This product is then put into suspension in liquid ammonia kept at −45° C. for one hour. The liquid ammonia is filtered which removes part of the $NH_4Cl$ while there remains on the filter 60 parts of a colourless product, which, applied to cotton fabric like the product of Example 1, confers on this fabric fireproof properties.

*Example 10*

60 parts by weight of the phosphorus chloronitride prepared as in Example 3 are dissolved in 300 parts by weight of ether. 200 parts by weight of ammonia of 22° Bé. are then added with strong agitation. The temperature rises to 44–45° C. About one hour after the addition of the ammonia the reaction has finished and the temperature has become normal (20° C.) again. The ether is decanted then it is evaporated. 30 parts by weight of a colourless product is obtained, which, applied to cotton fabric as the final product of Example 3, confers on this fabric, fireproof properties.

*Example 11*

A mixture of 200 parts by weight $PCl_5$ and 52 parts by weight of dry and pulverized $NH_4Cl$ is refluxed for 20 hours in 640 parts by weight of tetrachloroethane. Hydrogen chloride is liberated for about 7 hours. The excess $NH_4Cl$ is eliminated by filtration and 1000 parts by weight of tetrachloroethane are added. 50–90, preferably 65–75, parts by weight of gaseous ammonia are then introduced the temperature of the mixture being kept between 0° C. and 10° C. The white product precipitated is pressed out and dried by vacuum evaporation.

There is thus obtained 120–140 parts by weight of raw product. 20 parts by weight of the raw product are dissolved in 100 parts of boiling water. A cotton fabric is introduced into this solution and then wrung out to 100%. The fabric thus impregnated is dried and heated to about 160° C. for 4–10 minutes. It is washed in warm water and dried. A fireproof product is produced which retains this property after several washes in water containing 5 gr. per litre of Marseilles soap and 2 gms. per litre of sodium carbonate.

*Example 12*

132 parts by weight of $PCl_3$ are mixed with 640 parts of tetrachloroethane and the mixture treated with 68 parts of dry gaseous chlorine. After the addition of 52 parts of ammonium chloride, it is heated under reflux for 20 hours. The chloronitride thus produced is utilized as in Example 11 and identical results are obtained.

I claim:

1. A process for the treatment of a fibrous cellulosic material which comprises impregnating the material with an aqueous solution consisting essentially of the water soluble products of the reaction of anhydrous ammonia on a halogenonitride of phosphorus, and thereafter subjecting the material to a temperature between 100° C. to 170° C.

2. A process for the treatment of a fibrous cellulosic material which comprises impregnating the material with an aqueous solution consisting essentially of the water soluble products of the reaction of anhydrous ammonia on a halogenonitride of phosphorus, drying the material and thereafter subjecting the dried material to a temperature between 100° C. to 170° C.

3. A fibrous cellulosic material treated in accordance with the process defined in claim 1.

References Cited in the file of this patent
UNITED STATES PATENTS

| | | |
|---|---|---|
| 2,334,710 | Krauth | Nov. 23, 1943 |
| 2,424,831 | Klaber | July 29, 1947 |
| 2,575,347 | Kumins et al. | Nov. 20, 1951 |
| 2,637,704 | Hurley | May 5, 1953 |

OTHER REFERENCES

Ann. Chim. 12, 169–280 (1939) (brief translation in Chem. Abstracts, vol. 33, Oct.-Nov. 1939, p. 9177⁵).

Chem. Rev. 32, 109–33 (1943).